United States Patent
Shiroki et al.

(10) Patent No.: US 10,848,342 B2
(45) Date of Patent: Nov. 24, 2020

(54) VEHICLE COMMUNICATION CONTROL SYSTEM

(71) Applicant: Yazaki Corporation, Tokyo (JP)

(72) Inventors: Takashi Shiroki, Shizuoka (JP); Takayuki Ueda, Shizuoka (JP); You Yanagida, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/241,935

(22) Filed: Jan. 7, 2019

(65) Prior Publication Data
US 2019/0229946 A1 Jul. 25, 2019

(30) Foreign Application Priority Data

Jan. 19, 2018 (JP) .................................. 2018-007020

(51) Int. Cl.
*H04L 12/40* (2006.01)
*H04L 29/06* (2006.01)
*H04L 12/66* (2006.01)
*H04L 12/46* (2006.01)

(52) U.S. Cl.
CPC .......... *H04L 12/40* (2013.01); *H04L 12/4625* (2013.01); *H04L 12/66* (2013.01); *H04L 69/08* (2013.01); *H04L 2012/40273* (2013.01)

(58) Field of Classification Search
CPC ..... H04L 12/40; H04L 12/4625; H04L 12/66; H04L 69/08; H04L 2012/40273; H04L 49/351; H04B 1/3822
See application file for complete search history.

(56) References Cited

U.S. PATENT DOCUMENTS

| 2007/0106441 A1* | 5/2007 | Ono .................... B60W 10/06 701/36 |
| 2010/0215043 A1* | 8/2010 | Hisada .................. H04L 12/40 370/392 |
| 2012/0254980 A1 | 10/2012 | Takahashi |
| 2016/0065298 A1* | 3/2016 | Nakagawa ......... H04B 7/15528 370/315 |
| 2017/0072876 A1* | 3/2017 | Rajan .................. G06F 13/4282 |

FOREIGN PATENT DOCUMENTS

JP          2012-209633 A      10/2012

* cited by examiner

*Primary Examiner* — Kibrom T Hailu
(74) *Attorney, Agent, or Firm* — Kenealy Vaidya LLP

(57) ABSTRACT

A communication control system includes a first communication control device that includes a switching unit, a first gateway unit, a first power supply unit, and a first housing. The switching unit is provided in a vehicle, has a plurality of ports, and distributes a signal thereto. The first gateway unit has the CPU that is coupled to any one of the ports to convert a communication protocol of a signal. The first power supply unit supplies electric power to the switching unit and the first gateway unit. The first housing accommodates the switching unit, the first gateway unit, and the first power supply unit. The CPU can execute security processing for monitoring the switching unit.

1 Claim, 1 Drawing Sheet

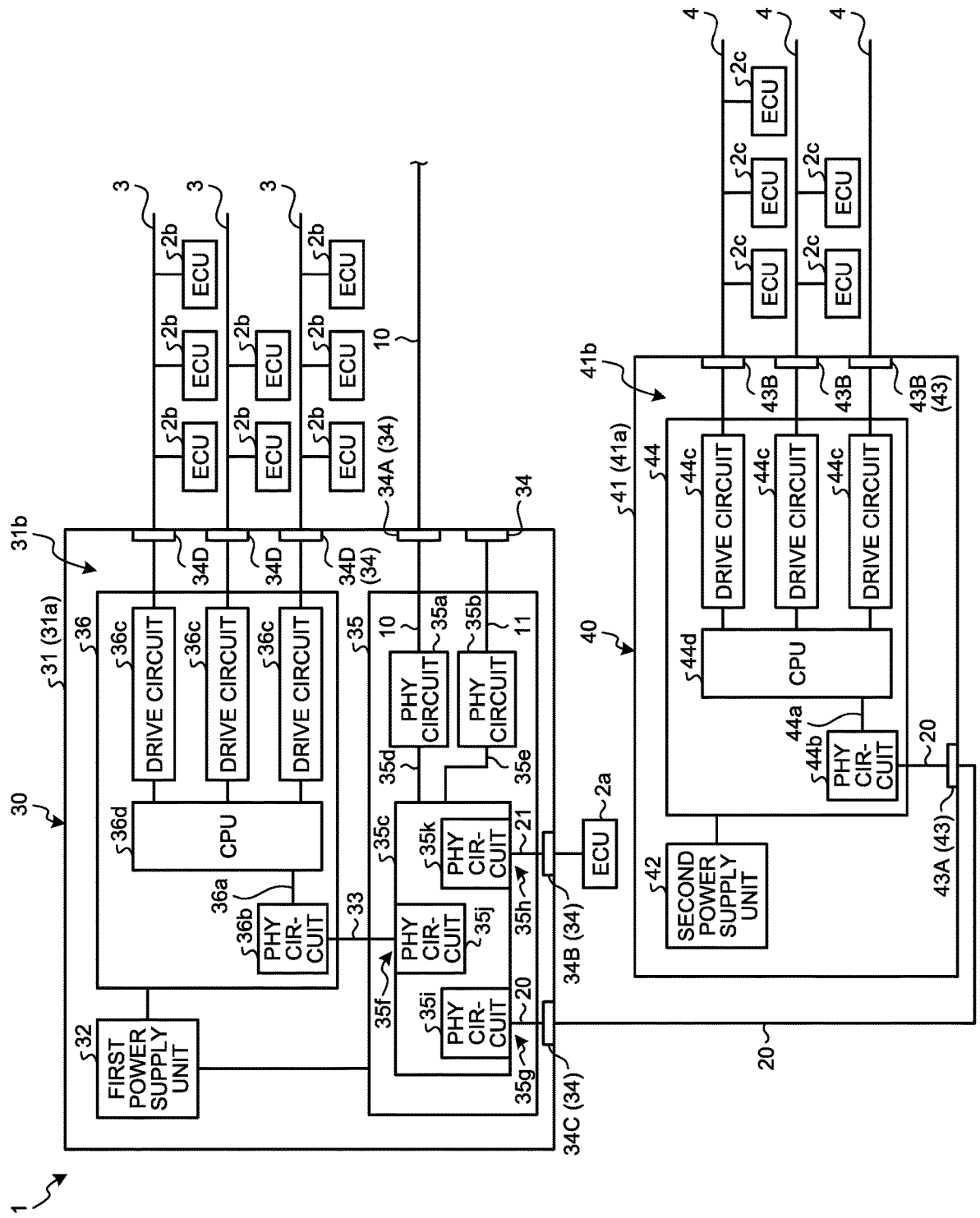

VEHICLE COMMUNICATION CONTROL SYSTEM

CROSS-REFERENCE TO RELATED APPLICATION(S)

The present application claims priority to and incorporates by reference the entire contents of Japanese Patent Application No. 2018-007020 filed in Japan on Jan. 19, 2018.

BACKGROUND OF THE INVENTION

1. Field of the Invention

The present invention relates to a vehicle communication control system.

2. Description of the Related Art

Conventionally, as a vehicle communication control system, for example, Japanese Patent Application Laid-open No. 2012-209633 discloses a quarantine network system including a switching hub that distributes a received packet to each port and a management server that is coupled to the switching hub to monitor security of the switching hub. This management server determines, for example, whether a terminal coupled to the switching hub satisfies a security policy.

By the way, in the quarantine network system described in Japanese Patent Application Laid-open No. 2012-209633 above, for example, since a management server is required to monitor security of the switching hub, there is a tendency for the system to become larger, and in this respect, there remains further improvement.

SUMMARY OF THE INVENTION

The present invention has been made in view of the above, and an object thereof is to provide a vehicle communication control system capable of suppressing an increase in size of a system.

In order to solve the above mentioned problem and achieve the object, a vehicle communication control system according to one aspect of the present invention includes a first vehicle communication control device that includes a switching unit that is provided in a vehicle, has a plurality of ports, and distributes a signal to the ports, a first gateway unit that has a first controller coupled to any one of the ports to convert a communication protocol of a signal, a first power supply unit that supplies electric power to the switching unit and the first gateway unit, and a first housing that accommodates the switching unit, the first gateway unit, and the first power supply unit, wherein the first controller is capable of executing security processing for monitoring the switching unit.

According to another aspect of the present invention, in the vehicle communication control system, it is preferable that a second vehicle communication control device different from the first vehicle communication control device, wherein the switching unit has a plurality of switching unit side physical layer circuits each provided at the ports, the second vehicle communication control device includes a second gateway unit that has a second gateway unit side physical layer circuit coupled to the switching unit side physical layer circuits and a second controller coupled to the second gateway unit side physical layer circuit to convert a communication protocol of a signal, a second power supply unit that supplies electric power to the second gateway unit, and a second housing that accommodates the second gateway unit and the second power supply unit, and the switching unit side physical layer circuits and the second gateway unit side physical layer circuit convert a signal transmitted between the ports and the second controller into a mutually communicable signal.

According to still another aspect of the present invention, in the vehicle communication control system, it is preferable that the switching unit has the switching unit side physical layer circuits provided respectively at the ports, the first gateway unit has a first gateway unit side physical layer circuit coupled to the switching unit side physical layer circuits and coupled to the first controller, and the switching unit side physical layer circuits and the first gateway unit side physical layer circuit convert a signal transmitted between the ports and the first controller into a mutually communicable signal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a configuration example of a vehicle communication control system according to an embodiment.

DETAILED DESCRIPTION OF THE PREFERRED EMBODIMENTS

A form for carrying out the present invention (embodiment) will be described in detail below with reference to the drawing. The present invention is not limited by contents described in the embodiment below. In addition, components described below include those which can be easily assumed by those skilled in the art and those which are substantially identical. Further, configurations described below can be appropriately combined. In addition, various omissions, substitutions, or changes in configuration can be made without departing from the gist of the present invention.

Embodiment

A communication control system 1 as a vehicle communication control system according to the embodiment will be described below. The communication control system 1 is a system mounted on a vehicle and controls communication of an in-vehicle local area network (LAN) that is a communication network in the vehicle. The in-vehicle LAN is, for example, a network based on the Ethernet (registered trademark) standard. As illustrated in FIG. 1, the communication control system 1 includes a trunk line 10, a communication line 20, a first communication control device 30 as a first vehicle communication control device, and a second communication control device 40 as a second vehicle communication control device.

The trunk line 10 is, for example, a communication line of 1000BASE-T1 or 1000BASE-RH standard with a communication speed of about 1 Gbps. The trunk line 10 is a communication line that couples between the first communication control device 30 and another communication control device (not illustrated). For example, one end of the trunk line 10 is connected to a PHY (Physical layer) circuit 35a of the first communication control device 30, and the other end is connected to a PHY circuit of another communication control device.

The communication line 20 couples between the first communication control device 30 and the second communication control device 40. For example, one end of the communication line 20 is connected to a PHY circuit 35i of the first communication control device 30, and the other end is connected to a PHY circuit 44b of the second communication control device 40.

The first communication control device 30 is a device that controls communication of the in-vehicle LAN. The first communication control device 30 includes a first housing 31, a first power supply unit 32, a communication line 33, a plurality of first connectors 34 (34A to 34D), a switching unit 35, and a first gateway unit 36.

The first housing 31 accommodates electronic components. The first housing 31 has a plurality of wall portions 31a and an internal space 31b formed by being surrounded by each of the wall portions 31a. The first housing 31 accommodates the first power supply unit 32, the switching unit 35, and the first gateway unit 36 in the internal space 31b. In the first housing 31, each of the first connectors 34 (34A to 34D) is provided on a predetermined wall portion 31a.

The first power supply unit 32 is a circuit that supplies electric power. The first power supply unit 32 is coupled to an external battery (not illustrated), the switching unit 35, and the first gateway unit 36. The first power supply unit 32 converts a voltage of electric power supplied from an external battery into a predetermined voltage. Then, the first power supply unit 32 supplies the electric power of the converted voltage to the switching unit 35 and the first gateway unit 36.

The communication line 33 couples the switching unit 35 and the first gateway unit 36. One end of the communication line 33 is connected to a PHY circuit 35j of the switching unit 35, and the other end is connected to a PHY circuit 36b of the first gateway unit 36.

Each of the first connectors 34 (34A to 34D) connects wirings. Each of the first connectors 34 has a connection terminal (not illustrated). In each of the first connectors 34, the switching unit 35 or the first gateway unit 36 is coupled to one end of the connection terminal. Each of the first connectors 34 has the other end of the connection terminal exposed to an outside of the first housing 31. In the first connector 34A, the switching unit 35 is coupled to one end of the connection terminal, and another communication control device is coupled to the other end of the connection terminal. In the first connector 34B, the switching unit 35 is coupled to one end of the connection terminal, and an electronic controller (ECU) 2a is coupled to the other end of the connection terminal. In the first connector 34C, the switching unit 35 is coupled to one end of the connection terminal, and the second communication control device 40 is coupled to the other end of the connection terminal. In each of the first connectors 34D, the first gateway unit 36 is coupled to one end of the connection terminal, and a plurality of ECUs 2b is coupled to the other end of the connection terminal.

The switching unit 35 transfers a signal transmitted to the in-vehicle LAN. The switching unit 35 has PHY circuits 35a and 35b and a switching circuit 35c. The PHY circuits 35a and 35b execute processing of a part related to a physical layer of an OSI reference model. As is well known, the PHY circuits 35a and 35b each have a physical medium dependent (PMD) for converting a waveform of a signal, a physical medium attachment (PMA) for converting a signal into a serial or a parallel format, and a physical coding sublayer (PCS) for encoding media access control (MAC) frames. The PHY circuit 35a is coupled to the switching circuit 35c through a communication line 35d and is connected to one end of the trunk line 10. The PHY circuit 35a converts a signal transmitted between the communication line 35d and the trunk line 10 into a signal suitable for the communication line 35d or the trunk line 10. The PHY circuit 35a processes, for example, a signal output from the trunk line 10 by a coding procedure that is a procedure of the physical medium dependent, the physical medium attachment, and the physical coding sublayer and outputs the processed signal to the communication line 35d. The PHY circuit 35b is coupled to the switching circuit 35c through a communication line 35e and is coupled to the first connector 34 through a communication line 11.

The switching circuit 35c transfers a signal. The switching circuit 35c has a plurality of ports 35f, 35g, and 35h. The ports 35f, 35g, and 35h each have a unique number. The switching circuit 35c has, for example, a MAC address table in which the numbers of the ports 35f, 35g, and 35h are associated with destination MAC addresses. A destination MAC address is a unique number included in a MAC frame and registered to identify a device on a network. The switching circuit 35c refers to the MAC address table, distributes a signal output from the trunk line 10 to predetermined ports 35f, 35g, and 35h, and transfers the signal to the first gateway unit 36, the second communication control device 40, or the ECU 2a.

PHY circuits 35i, 35j, and 35k as switching unit side PHY circuits are provided at the ports 35f, 35g, and 35h, respectively. The PHY circuit 35i is provided at the port 35g of the switching circuit 35c and is coupled to the second communication control device 40 through the communication line 20. The PHY circuit 35i converts a signal transmitted through the communication line 20 and the like between the port 35g of the switching circuit 35c and a CPU 44d of the second communication control device 40 into a mutually communicable signal. The PHY circuit 35i converts, for example, a signal transmitted between the switching circuit 35c and the communication line 20 into a signal suitable for the switching circuit 35c or the communication line 20. The PHY circuit 35i processes, for example, a signal output from the switching circuit 35c by a medium dependent procedure that is a procedure of the physical coding sublayer, the physical medium attachment, and the physical medium dependent and outputs the processed signal to the communication line 20.

The PHY circuit 35j is provided at the port 35f of the switching circuit 35c and is coupled to the first gateway unit 36 through the communication line 33 and the like. The PHY circuit 35j converts a signal transmitted through the communication line 33 and the like between the port 35f of the switching circuit 35c and a CPU 36d of the first gateway unit 36 into a mutually communicable signal. The PHY circuit 35j converts, for example, a signal transmitted between the switching circuit 35c and the communication line 33 into a signal suitable for the switching circuit 35c or the communication line 33. The PHY circuit 35j processes, for example, a signal output from the switching circuit 35c by the medium dependent procedure and outputs the processed signal to the communication line 33.

The PHY circuit 35k is provided at the port 35h of the switching circuit 35c and is coupled to the ECU 2a through a communication line 21. The PHY circuit 35k converts a signal transmitted through the communication line 21 between the port 35h of the switching circuit 35c and the ECU 2a into a mutually communicable signal. The PHY circuit 35k converts, for example, a signal transmitted between the switching circuit 35c and the communication line 21 into a signal suitable for the switching circuit 35c or the communication line 21. The PHY circuit 35k processes, for example, a signal output from the switching circuit 35c by the medium dependent procedure and outputs the processed signal to the communication line 21.

The first gateway unit 36 converts a communication protocol of a signal. The first gateway unit 36 has a communication line 36a, the PHY circuit 36b as a first gateway unit side PHY circuit, a plurality of drive circuits 36c, and the CPU 36d as a first controller. The communication line 36a is a transmission medium different from the communication line 33 and couples the PHY circuit 36b and the CPU 36d. The communication line 36a is, for example, a signal line according to a media independent interface (XMII) standard. An XMII defines communication standards between a physical layer and a data link layer of the OSI reference model. The PHY circuit 36b is coupled to the switching circuit 35c through the communication line 33 and is coupled to the CPU 36d through the communication line 36a. The PHY circuit 36b converts a signal transmitted through the communication lines 33 and 36a between the port 35f of the switching circuit 35c and the CPU 36d into a mutually communicable signal. The PHY circuit 36b converts, for example, a signal transmitted between the communication lines 33 and 36a into a signal suitable for the communication line 33 or 36a. The PHY circuit 36b processes, for example, a signal output from the communication line 33 by the coding procedure and outputs the processed signal to the communication line 36a.

Each drive circuit 36c is a circuit that generates a signal for driving each ECU 2b. Each drive circuit 36c is coupled to the CPU 36d and each first connector 34D. The ECUs 2b are coupled to each first connector 34D through each communication line 3. Each drive circuit 36c generates a signal for driving each ECU 2b based on a signal output from the CPU 36d and outputs the generated signal to each ECU 2b.

The CPU 36d converts a communication protocol of a signal. The CPU 36d is coupled to the port 35f of the switching unit 35 through the PHY circuit 36b and the like. Further, the CPU 36d is coupled to each drive circuit 36c. The CPU 36d converts, for example, a communication protocol of a signal output from the switching unit 35. Then, the CPU 36d outputs a signal obtained by converting the communication protocol to each drive circuit 36c. Further, the CPU 36d can execute security processing for monitoring the switching unit 35. The CPU 36d monitors, for example, a terminal coupled to each of the ports 35g and 35h as security processing. For example, when a terminal (unauthorized terminal) of which a destination MAC address is different from that of a terminal registered in advance in a MAC address table is coupled to the ports 35g and 35h, the CPU 36d makes the ports 35g and 35h unusable to prevent unauthorized invasion into the in-vehicle LAN. Further, as security processing, the CPU 36d stores, for example, an operating state such as a traffic condition of the switching circuit 35c in a storage unit, so that the operating state can be taken out by a management terminal. Note that the CPU 36d may execute security processing other than the above example.

The second communication control device 40 is a device that controls communication of the in-vehicle LAN and is a device different from the first communication control device 30. The second communication control device 40 includes a second housing 41, a second power supply unit 42, a plurality of second connectors 43 (43A and 43B), and a second gateway unit 44.

The second housing 41 accommodates electronic components. The second housing 41 has a plurality of wall portions 41a and an internal space 41b formed by being surrounded by each of the wall portions 41a. The second housing 41 accommodates the second power supply unit 42 and the second gateway unit 44 in the internal space 41b. In the second housing 41, each of the second connectors 43 (43A and 43B) is provided on a predetermined wall portion 41a.

The second power supply unit 42 is a circuit that supplies electric power. The second power supply unit 42 is coupled to an external battery (not illustrated) and the second gateway unit 44. The second power supply unit 42 converts a voltage of electric power supplied from an external battery into a predetermined voltage. Then, the second power supply unit 42 supplies the electric power of the converted voltage to the second gateway unit 44.

Each of the second connectors 43 (43A and 43B) connects wirings. Each of the second connectors 43 has a connection terminal (not illustrated). In each of the second connectors 43, the second gateway unit 44 is coupled to one end of the connection terminal. Each of the second connectors 43 has the other end of the connection terminal exposed to an outside of the second housing 41. In the second connector 43A, the first communication control device 30 is coupled to the other end of the connection terminal. In the second connector 43B, a plurality of ECUs 2c is coupled to the other end of the connection terminal.

The second gateway unit 44 converts a communication protocol of a signal and has a configuration equivalent to that of the first gateway unit 36. The second gateway unit 44 has a communication line 44a, the PHY circuit 44b as a second gateway unit side PHY circuit, a plurality of drive circuits 44c, and the CPU 44d as a second controller. The communication line 44a is a transmission medium different from the communication line 20 and couples the PHY circuit 44b and the CPU 44d. The communication line 44a is, for example, a signal line according to the XMII standard. The PHY circuit 44b is coupled to the switching unit 35 of the first communication control device 30 through the communication line 20 and is coupled to the CPU 44d through the communication line 44a. The PHY circuit 44b converts a signal transmitted between the port 35g of the switching circuit 35c and the CPU 44d of the second gateway unit 44 into a mutually communicable signal. The PHY circuit 44b converts, for example, a signal transmitted between the communication lines 20 and 44a into a signal suitable for the communication line 20 or 44a. The PHY circuit 44b processes, for example, a signal output from the communication line 20 by the encoding procedure and outputs the processed signal to the communication line 44a.

Each drive circuit 44c is a circuit that generates a signal for driving each ECU 2c. Each drive circuit 44c is coupled to the CPU 44d and each second connector 43B. A plurality of ECUs 2c is coupled to each second connector 43B through each communication line 4. Each drive circuit 44c generates a signal for driving each ECU 2c based on a signal output from the CPU 44d and outputs the generated signal to each ECU 2c.

The CPU 44d converts a communication protocol of a signal. The CPU 44d is coupled to the switching unit 35 of the first communication control device 30 through the PHY circuit 44b and the like. Further, the CPU 44d is coupled to each drive circuit 44c. The CPU 44d converts, for example, a communication protocol of a signal output from the switching unit 35 of the first communication control device 30. Then, the CPU 44d outputs a signal obtained by converting the communication protocol to each drive circuit 44c.

As described above, the communication control system 1 according to the embodiment includes the first communication control device 30 including the switching unit 35, the first gateway unit 36, the first power supply unit 32, and the first housing 31. The switching unit 35 is provided in a vehicle, has the ports 35f, 35g, and 35h, and distributes a signal thereto. The first gateway unit 36 has the CPU 36d that is coupled to any one of the ports 35f, 35g, and 35h to convert a communication protocol of a signal. The first power supply unit 32 supplies electric power to the switching unit 35 and the first gateway unit 36. The first housing 31 accommodates the switching unit 35, the first gateway unit 36, and the first power supply unit 32. The CPU 36d can execute security processing for monitoring the switching unit 35.

With this configuration, in the communication control system 1, the CPU 36d of the first gateway unit 36 can also function as a processor for security of the switching unit 35, so that it is possible to avoid providing a processor dedicated to security in the switching unit 35. Consequently, the communication control system 1 can realize weight saving of the system and line saving of wiring. As a result, the communication control system 1 can suppress an increase in size of the system.

The communication control system 1 includes the second communication control device 40 different from the first communication control device 30. The switching unit 35 has the PHY circuits 35i, 35j, and 35k provided at the ports 35f, 35g, and 35h, respectively. The second communication control device 40 includes the second gateway unit 44, the second power supply unit 42, and the second housing 41. The second gateway unit 44 has the PHY circuit 44b coupled to the PHY circuit 35i and the CPU 44d coupled to the PHY circuit 44b to convert a communication protocol of a signal. The second power supply unit 42 supplies electric power to the second gateway unit 44. The second housing 41 accommodates the second gateway unit 44 and the second power supply unit 42. The PHY circuits 35i and 44b convert a signal transmitted between the port 35g and the CPU 44d into a mutually communicable signal. With this configuration, the communication control system 1 can couple the second gateway unit 44 to the first communication control device 30 through the PHY circuit 44b, so that it is possible to improve extensibility of the second gateway unit 44.

In the communication control system 1, the switching unit 35 has the PHY circuits 35i, 35j, and 35k provided at the ports 35f, 35g, and 35h, respectively. The first gateway unit 36 has the PHY circuit 36b coupled to the PHY circuit 35j and coupled to the CPU 36d. The PHY circuits 35j and 36b convert a signal transmitted between the port 35f and the CPU 36d into a mutually communicable signal. With this configuration, since the first gateway unit 36 has the PHY circuit 36b, the communication control system 1 can share a substrate of the first gateway unit 36. In other words, the communication control system 1 can use the substrate of the first gateway unit 36 as a substrate of the second gateway unit 44. Through this sharing, the communication control system 1 can simplify a manufacturing process of the second gateway unit 44 and reduce manufacturing costs thereof.

The first communication control device 30 couples the first gateway unit 36 and the switching circuit 35c through the PHY circuits 36b and 35j, but the present invention is not limited thereto. For example, the first communication control device 30 may couple the first gateway unit 36 and the switching circuit 35c through a signal line according to the XMII standard.

In a vehicle communication control system according to the present embodiment, a first controller of a first gateway unit can execute security processing for monitoring a switching unit, so that the first controller of the first gateway unit can also function as a processor for security of the switching unit, and it is possible to avoid providing a processor dedicated to security in the switching unit. As a result, the vehicle communication control system can suppress an increase in size of the system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle communication control system comprising:
a first vehicle communication control device that includes
a switching unit that is provided in a vehicle, has a plurality of ports, and distributes a signal to the ports,
a first gateway unit that has a first controller coupled to any one of the ports to convert a communication protocol of a signal,
a first power supply unit that supplies electric power to the switching unit and the first gateway unit, and
a first housing that accommodates the switching unit, the first gateway unit, and the first power supply unit, wherein
the first controller is capable of executing security processing for monitoring the switching unit,
the vehicle communication control system further comprising:
a second vehicle communication control device different from the first vehicle communication control device, wherein
the switching unit has a plurality of switching unit side physical layer circuits each provided at the ports,
the second vehicle communication control device includes
a second gateway unit that has a second gateway unit side physical layer circuit coupled to the switching unit side physical layer circuits and a second controller coupled to the second gateway unit side physical layer circuit to convert a communication protocol of a signal,
a second power supply unit that supplies electric power to the second gateway unit, and
a second housing that accommodates the second gateway unit and the second power supply unit,
the switching unit side physical layer circuits and the second gateway unit side physical layer circuit convert a signal transmitted between the ports and the second controller into a mutually communicable signal,
the first gateway unit has a first gateway unit side physical layer circuit coupled to the switching unit side physical layer circuits and coupled to the first controller, and
the switching unit side physical layer circuits and the first gateway unit side physical layer circuit convert a signal transmitted between the ports and the first controller into a mutually communicable signal.

* * * * *